United States Patent
Desai et al.

(10) Patent No.: US 11,967,165 B2
(45) Date of Patent: Apr. 23, 2024

(54) ARTIFICIAL INTELLIGENCE (AI) BASED DOCUMENT PROCESSING AND VALIDATION

(71) Applicant: ACCENTURE GLOBAL SOLUTIONS LIMITED, Dublin (IE)

(72) Inventors: Vijay Desai, San Diego, CA (US); Ravi Prakash, Bangalore (IN); Ashok Rajaraman, British Columbia (CA)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 388 days.

(21) Appl. No.: 17/526,881

(22) Filed: Nov. 15, 2021

(65) Prior Publication Data
US 2023/0154222 A1 May 18, 2023

(51) Int. Cl.
| | |
|---|---|
| G06K 9/00 | (2022.01) |
| G06N 3/088 | (2023.01) |
| G06Q 20/10 | (2012.01) |
| G06Q 30/04 | (2012.01) |
| G06V 30/416 | (2022.01) |

(52) U.S. Cl.
CPC ........... G06V 30/416 (2022.01); G06N 3/088 (2013.01); G06Q 20/102 (2013.01); G06Q 30/04 (2013.01)

(58) Field of Classification Search
CPC .... G06V 30/416; G06V 30/418; G06N 3/088; G06N 3/044; G06N 3/08; G06N 5/01; G06N 7/01; G06N 20/20; G06N 20/00; G06Q 20/102; G06Q 30/04; G06Q 20/14; G06Q 20/4016; G06Q 30/0185; G06Q 40/12; G06Q 10/103; G06Q 10/04; G06Q 40/125

See application file for complete search history.

(56) References Cited

U.S. PATENT DOCUMENTS

2019/0220863 A1* 7/2019 Novick .................. G06Q 20/10

FOREIGN PATENT DOCUMENTS

| CA | 3128629 A1 * | 7/2016 | ........... G06F 16/254 |
| CA | 3104951 A1 * | 9/2020 | ........... C12Q 1/6874 |
| CA | 3117318 A1 * | 2/2021 | ......... G06Q 30/0185 |

* cited by examiner

*Primary Examiner* — Xin Jia
(74) *Attorney, Agent, or Firm* — Mannava & Kang, P.C.

(57) ABSTRACT

An Artificial Intelligence (AI) based document processing and validation system identifies anomalies such as errors, fraud, and duplicates of received documents and enables automatic actions for valid documents using machine learning (ML) techniques. The received documents are processed for determining probabilities for errors, fraud, and duplicates. A validation worklist is generated with the documents arranged in descending order of the probabilities and invalid documents with higher probabilities are flagged for review while the valid documents with lower probabilities are further processed for the execution of automatic actions. The feedback from the invalid document review is used to further train the models in determining the probabilities.

20 Claims, 10 Drawing Sheets

ARTIFICIAL INTELLIGENCE (AI) BASED DOCUMENT PROCESSING AND VALIDATION

BACKGROUND

Validation is a documented process of demonstrating that a system or process meets a defined set of requirements. The concept of validation can be applied in different contexts. For example, documents such as invoices, machinery or process diagrams, labels, etc., can require validation in addition to more complex validations such as validations of software systems, etc. Validation of documents such as invoices can require that the entries therein are accurate in addition to complying with the format and other requirements. Particularly, invoice validation includes a thorough review of the bills to ensure that any discrepancies are highlighted, acted upon, and rectified. This can be automated through accounting systems or conducted as a manual process.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
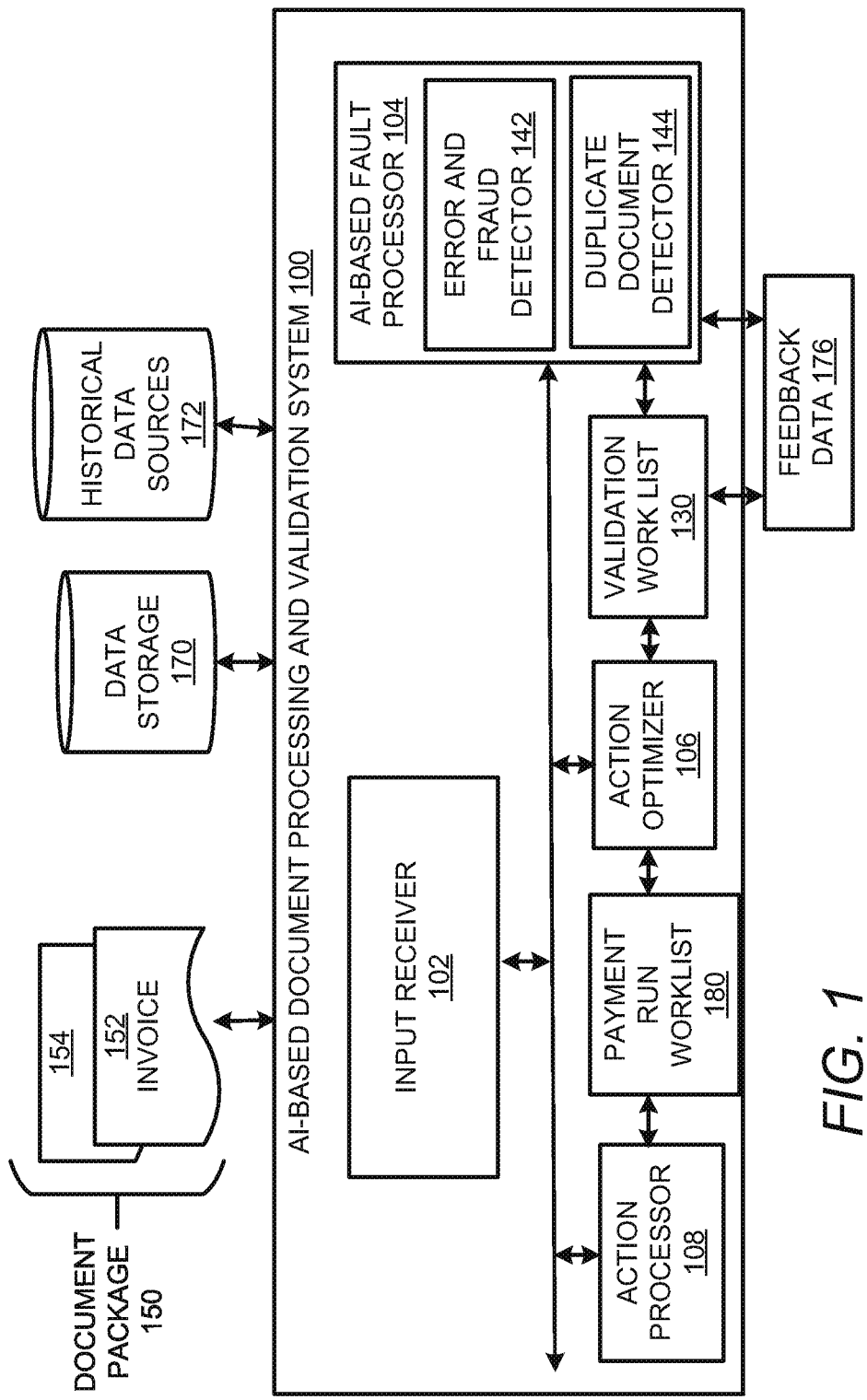
FIG. 1 shows a block diagram of an Artificial Intelligence (AI)-based document processing and validation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based document processing and validation system is disclosed. The document validation system receives a document package including one or more documents or invoices associated with automatic actions, processes the documents to automatically flag the documents with one or more of errors, fraud, and duplicates, and enables execution of the automatic actions for valid documents. While the examples for document processing are discussed herein with respect to invoices, it can be appreciated that the error and fraud processing or duplicate document identification techniques disclosed herein can be applied to other documents also. When a document package including documents such as invoices is received, the invoices therein are processed to detect errors, fraud, and duplicates. The invoices including the errors, fraud, and duplicates are flagged for further review while valid invoices without any errors, fraud, or duplicates are further processed for the execution of automatic actions such as automatic payments.

In order to identify errors, fraud, or duplicates, the document processing and validation system employs machine learning (ML) based models. For example, vendor profiles are initially constructed from vendor data. Features are extracted from the vendor profiles. Any existing features can be adjusted or updated with the data associated with each new document package including newer invoices. The invoices in the document package are accessed and are scored by an ML-based anomaly detection model for error and fraud detection. The anomaly detection model can be trained via unsupervised techniques for detecting fraud and errors in different invoices. In an example, the anomaly detection model can include unsupervised outlier detection models such as but not limited to Isolation forest, Cluster-Based Local Outlier Factor (CBLOF), autoencoder, etc. Each of the invoices from the document package is scored by the anomaly detection model and probabilities indicative of the invoice including one or more of errors and fraud are generated.

The invoices which are processed for error and fraud detection are further processed for duplicate identification. The invoices from the data package that is to be processed for duplicate identification are stored to an index of invoices. The index can be queried for recommendations of similar invoices. Similar invoices can be selected from the data package and/or prior invoices in historical data sources. Similarity graphs are created from the recommendations. The similarity graphs are decomposed into sets of similar invoices using graphic theoretic algorithms, logical composition, and other techniques. The sets can be classified as duplicates based on set-level, document-level/invoice-level, and vendor-level features by the duplicate detection model. In an example, methods such as eXtreme Gradient boost (XG Boost), feed-forward neural network, etc., can be implemented by the duplicate detection model. In an example, the scores can be re-scaled based on other invoice attributes such as invoice amounts, etc. A validation worklist is generated upon processing the invoices for error, fraud, and duplicate detection. The validation worklist orders the invoices in descending order of the scores i.e., descending order of invalidity so that invoices with the highest probability of errors, fraud, or duplicates occur at the top of the validation worklist.

The invoices at the top of the validation worklist (e.g., the top N invoices, wherein N is a natural number and N=1, 2, 3, . . . ) with higher probabilities of errors, fraud, and duplicates are flagged for further review. In an example, the flagged invoices can be reviewed by human reviewers who can provide feedback regarding the errors, fraud, and duplicates flagged by the AI-based document processing and validation system. The feedback from the human reviewers can be provided as training data to the anomaly detection model and the duplicate detection model. The invoices lower down in the validation worklist have lower probabilities for error, fraud, or duplicates and hence are determined to be valid. Hence, they can be forwarded for processing that enables the execution of automatic actions. In an example, the AI-based document processing and validation system can be configured with threshold probabilities or include trained AI models (e.g., classifiers) that can segregate valid invoices that can be automatically processed from invalid invoices requiring review.

The valid invoices are provided for enabling automatic actions which includes determining a time for the execution of the automatic actions for each of the invoices i.e., early or late execution of the automatic actions. The AI-based document processing and validation system is, therefore, configured to predict, for the specific time period(s), payment dates for the invoices with due dates within the specified time periods. The AI-based document processing and validation system can generate predictions that a given invoice with a due date within the specific time period can be paid early (i.e., either on time or before the due date) or late (i.e., after the due date). The payment predictions can be generated by trained neural networks (NN) using features extracted from input data including but not limited to, the invoice and vendor data, the anomaly and duplicate probabilities, etc.

The document processing and validation system disclosed herein provides for a technical improvement in the field of document processing and validation systems that enable automatic actions. Generation of the validation worklist ordering the documents/invoices in accordance with the probabilities for errors and duplicates mitigates the need for analyzing each document for determining errors, fraud, or duplicates. The AI-based document processing and validation system, therefore, flags a subset of the received invoices for review while the remaining invoices are forwarded for the execution of the automatic action. Thus, the AI-based document processing and validation system substantially cuts the volume of documents to be reviewed (and therefore the time for document review). Furthermore, as seen from certain results discussed infra, ordering the invoices per the error and duplicate probabilities in the validation worklist enables the AI-based document processing and validation system to identify nearly 100% of the errors and duplicates within the top 20-40% of the invoices and thereby allowing the remaining 60-80% of the invoices to pass through for automatic payments. Such reduction in volume of documents to be reviewed for validity and the detection of errors, fraud, and duplicates in the initial subset of documents to be reviewed, makes the document processing and validation system faster and efficient.

FIG. 1 shows a block diagram of an AI-based document processing and validation system 100 in accordance with the examples disclosed herein. The AI-based document processing and validation system 100 receives a document package that includes one or more documents that are processed to detect and identify one or more of errors, frauds, duplicates, etc., therewithin. Those documents which are free from such faults are further processed to determine an order of execution of automatic actions relating to the documents. For example, a document package 150 can include documents such as invoices 152, 154 that are processed to identify faults, errors, duplicates, etc. Such faulty/invalid invoices are marked for further review. An invoice can be a time-stamped commercial document that itemizes and records a transaction between a buyer and a seller. If goods or services were purchased on credit, the invoice usually specifies the terms of the deal and provides information on the available methods of payment. The invoices, which are free from such faults are processed to determine an order of execution of an automatic action such as an automatic payment. The AI-based document processing and validation system 100 includes an input receiver 102, an AI-based fault processor 104, an action optimizer 106, and an action processor 108. The AI-based document processing and validation system 100 can also be coupled to one or more data sources. The data storage 170 can be used for storing data that is generated and used during the various validation and automatic execution processes. The AI-based document processing and validation system 100 can also be coupled to historic data sources 172 which may be used to store feedback data and historical data for training the models used by the AI-based document processing and validation system 100.

The input receiver 102 receives the document package 150 including the invoices 152, 154 which may be received in a digital/machine-readable format, else the input receiver 102 can convert the documents 152, 154 into digital formats. The AI-based fault processor 104 includes an error and fraud detector 142, and the duplicate document detector 144. The error and fraud detector 142 analyzes each of the invoices 152, 154, etc., and flags invoices for potential non-compliance issues, errors in field values, fraud, etc. The flagged invoices are prioritized based on a score which can be a combination of model score, and invoice amount to ensure that invoices that have a high risk of error and/or fraud and higher value invoices are validated first. The output of the error and fraud detector 142 is an error and fraud detection (EFD) score is indicative of the likelihood of the document/invoice including anomalies such as errors and/or fraud.

The duplicate document detector 144 also analyzes each of the invoices 152, 154, and forms sets of invoices, including elements, which may be potentially duplicates of each other. The sets of invoices are further scored for the probability of containing duplicates using machine learning (ML) models such as XG Boost, neural networks, etc. The output of the AI-based fault processor 104 is a validation worklist 130 which includes all the invoices from the document package 150 arranged in ranked order of anomaly probabilities. In an example, an aggregate fault score can be calculated for each invoice to determine the position of the invoice in the validation worklist 130. In another example, the duplicate document detector 144 can employ the anomaly scores for identifying the duplicates within the documents of the document package 150. Accordingly, invoices that have higher probabilities of faults, errors, and/or duplicates are arranged at the top of the validation worklist 130 while the invoices with the lower fault scores are arranged at the bottom of the validation worklist 130. The AI-based fault processor 104 can be configured with a threshold score below which an invoice is considered as a valid invoice and is allowed for further processing by the action optimizer 106. Invoices having scores above the thresholds scores are flagged for further review. Upon completion of the further review, a subset of the flagged invoices may be considered as valid and can be allowed for further processing by the action optimizer 106 while those which are considered as invalid can be transmitted back to the source providing the document package 150.

In an example, the AI-based document processing and validation system 100 can be coupled to historic data sources 172 which can be used to store the feedback data 176 in addition to other historic data which can be used to train the different models used by the AI-based document processing and validation system 100. The AI-based fault processor 104 can receive feedback data 176 from the further processing regarding the valid and invalid invoices from among those that were flagged. In an example, the validation worklist 130 including the ranked valid and invalid invoices can be reviewed manually and the feedback data 176 is provided by the reviewers to the AI-based fault processor 104. The feedback data 176 can be employed for training the ML models used by the error and fraud detector 142 and the duplicate document detector 144.

The valid invoices are provided to the action optimizer 106 which optimizes the time at which automatic payment actions can occur within certain restrictions including temporal and fiscal constraints. While some invoices can be paid early, some invoices can be paid later. Furthermore, certain discounts can be availed when the invoices meet certain conditions. The action optimizer 106 provides predictions regarding the payment time for each of the invoices 152, 154 in the document package 150 so that the discounts and the cash flow of the entity whose invoices are processed are maximized. For example, automatic payments can be scheduled so that a predetermined lower limit corresponding to the fiscal constraint is not breached. A payment worklist 180 is output by the action optimizer 106 which orders the invoices 152, 154, etc., in a predetermined order of their payment dates, e.g., either from the earliest invoice to be paid to the last invoice to be paid or vice versa. The payment worklist 180 is provided to the action processor 108 which can enable automatic actions such as automatic payments on the invoices in the payment worklist 180 in accordance with their arrangement order.

Figure 2:
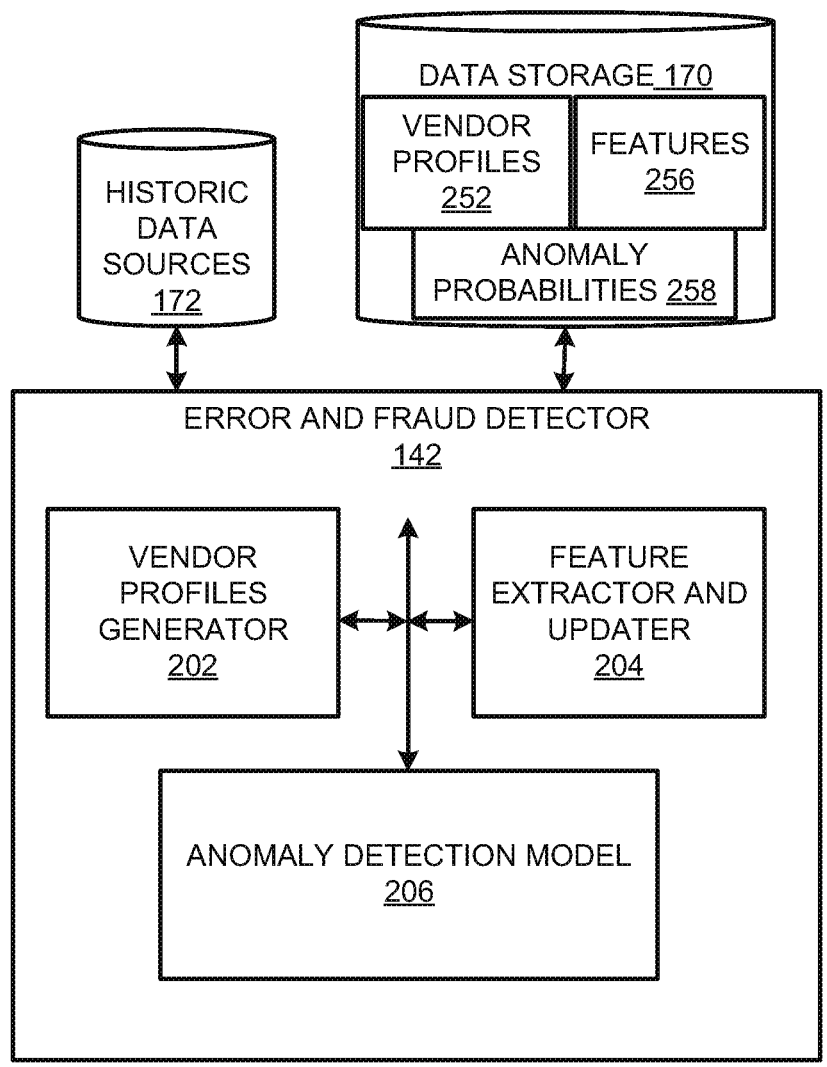
FIG. 2 shows a block diagram of an error and fraud detector in accordance with the examples disclosed herein.

FIG. 2 shows a block diagram of the error and fraud detector 142 in accordance with the examples disclosed herein. The error and fraud detector 142, processes the invoices 152, 154, etc., using a vendor profiles generator 202, a feature extractor and updater 204, and an anomaly detection model 206 to output potential anomalous invoices with scores and reason codes. The vendor profiles generator 202 generates vendor profiles 252 to understand historical vendor behavior i.e., amount distribution, invoice number patterns, currencies used, etc. In an example, frequency, and tables can be used for categorical data variables, variables for numeric data, etc. Therefore, whenever an invoice is received, the historical vendor behavior associated with the invoice can be used to analyze the invoice. Additionally, the data extracted from the invoice can be used to update the vendor profile. The feature extractor and updater 204 extracts and updates features 256 from the vendor profiles 252. Furthermore, the features 256 are updated based on the feedback 176 received from the further review of the validation worklist 130.

The updated features can be employed by the anomaly detection model 206 to rank the invoices 152, 154 in the document package 150 for identifying the errors, fraud, etc. The errors can include typographical mistakes, formatting errors, etc. In an example, the anomaly detection model 206 can include ML models such as isolation forest, CBLOF, trained on data from historical data sources 172 for outlier/anomaly identification. The anomaly detection model 206 can output the probability that each of the invoices 152, 154, etc., is anomalous. The anomaly probabilities 258 output by the anomaly detection model 206 can be made accessible to the duplicate document detector 144 for further processing.

Figure 3:
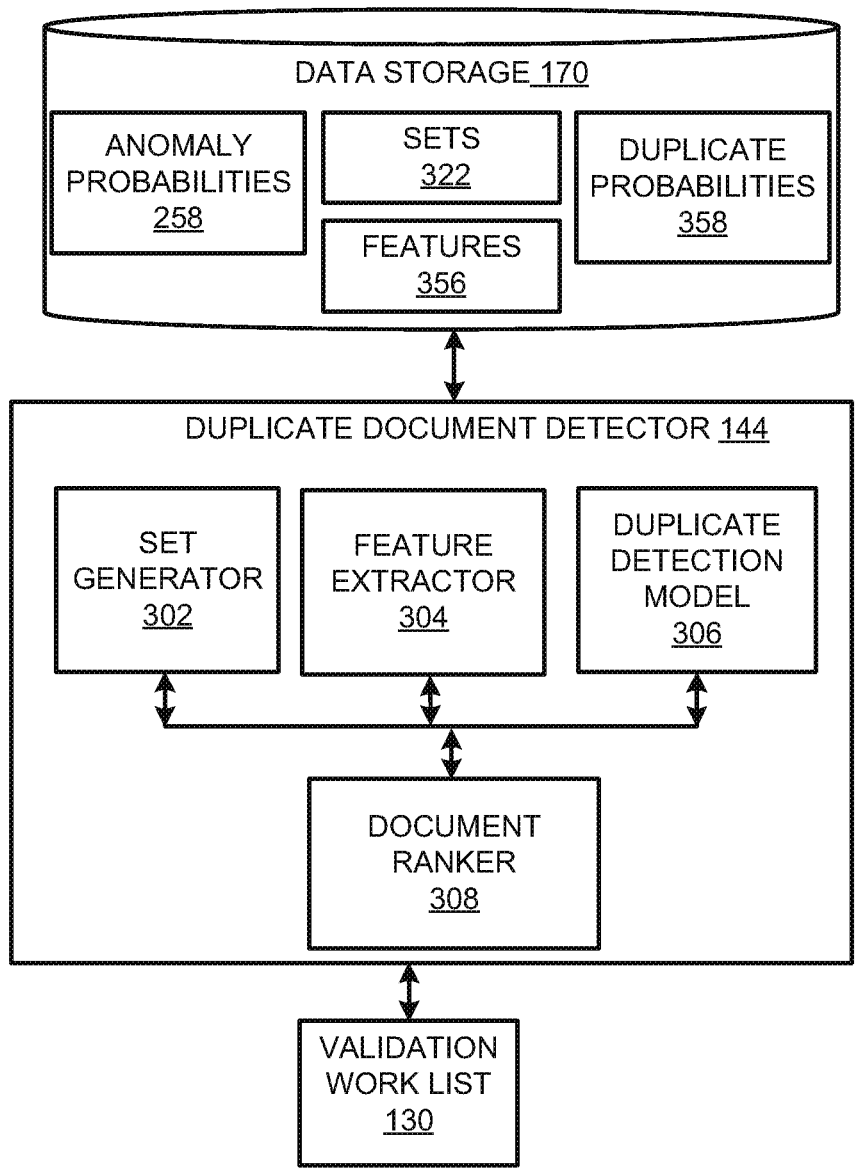
FIG. 3 shows a block diagram of a duplicate document detector in accordance with the examples disclosed herein.

FIG. 3 shows a block diagram of the duplicate document detector 144 in accordance with the examples disclosed herein. The duplicate document detector 144 identifies duplicate documents/invoices within the document package 150 using a set generator 302, a feature extractor 304, a duplicate detection model 306, and a document ranker 308. In an example, the duplicate document detector 144 can receive as input, open/page invoices, the anomaly probabilities 258 generated by the error and fraud detector 144, and feedback data 176. The set generator 302 generates sets 322 by considering sequences defined by the account/vendor. More particularly, the set generator 302 employs an index that is updated with each new received invoice and processed by a recommendation engine. The recommendations are converted to the sets 322 based on associated connections.

The feature extractor 304 can be trained to automatically extract features 356 for each of the sets based on set properties, invoice properties, and historical profiles, etc. For example, methods such as MinHash can be used for text feature extraction, etc. The features 356 are used by the duplicate detection model 306 for identifying duplicate invoices for the documents 152, 154 within one or more of the document package 150 and the historical data sources 172. More particularly, the duplicate detection model 306, scores new sets that are formed as new invoices are received. The scores i.e., the duplicate probabilities 358 can be indicative of the presence of duplicate invoices in one or more of the document package 150 and the historical data sources 172. The anomaly probabilities 258 and the duplicate probabilities 358 can be aggregated in a predetermined manner by the document ranker 308 to rank the invoices 152, 154, etc., in the document package 150 to generate the validation worklist 130. As mentioned above, the validation worklist 130 lists the invoices in descending order of probabilities (i.e., invalidity) and invoice values so that invoices associated with higher amounts and higher probabilities of errors, frauds, and/or duplicates are provided for further processing while the remaining valid invoices are provided to the action optimizer 106 for scheduling the automatic actions such as the automatic payments. In an example, the top N documents or invoices in the validation worklist 130 can be flagged for further review while the remaining documents/invoices can be provided to the action optimizer 106 for the execution of the corresponding automatic actions.

In an example, the feedback data 176 received from the further review of the flagged documents can be provided to the AI-based fault processor 104. The feedback data 176 can serve as labeled data for explicitly training the ML models i.e., one or more of the anomaly detection model 206 and the duplicate detection model 306.

Figure 4:
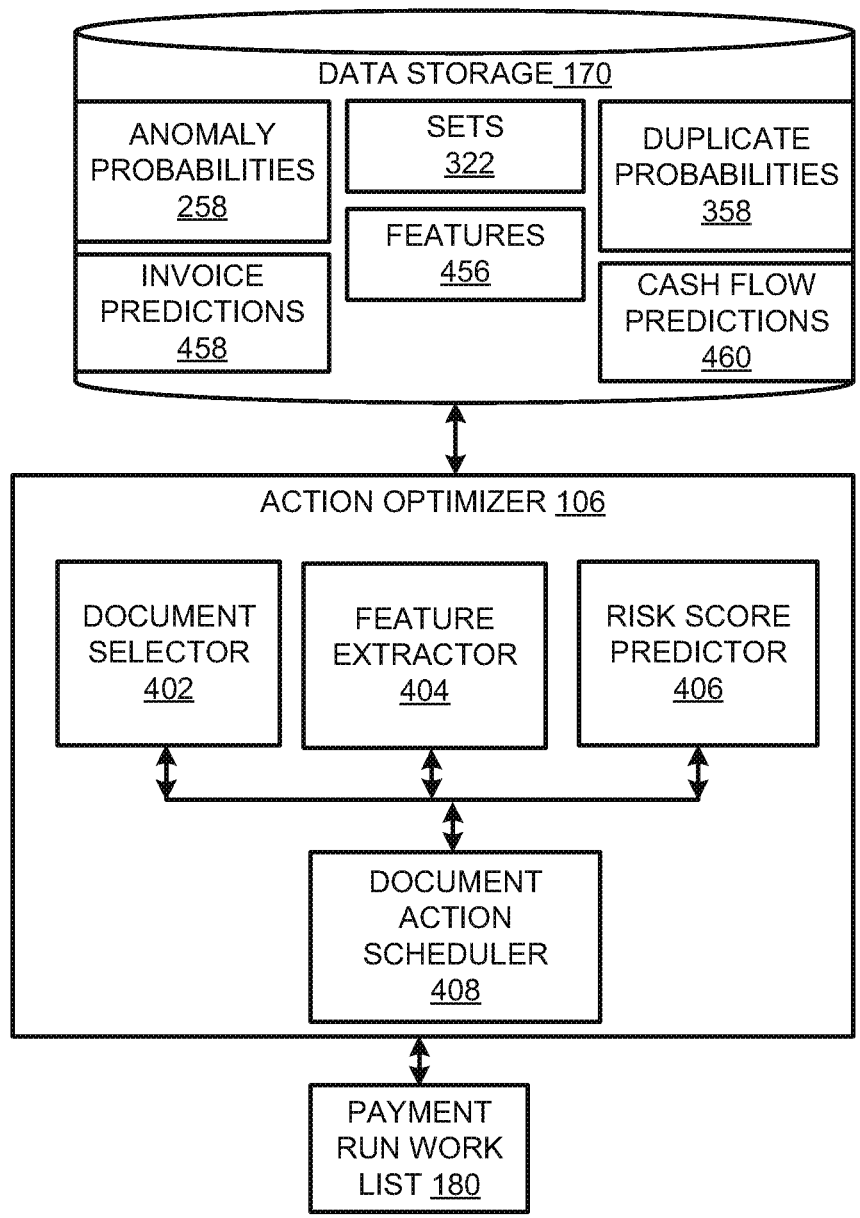
FIG. 4 shows a block diagram of an action optimizer in accordance with the examples disclosed herein.

FIG. 4 shows a block diagram of the action optimizer 106 in accordance with the examples disclosed herein. The action optimizer 106 includes a date-document selector 402, a feature extractor 404, risk score predictor 406, and a document action scheduler 408. The action optimizer 106 is configured for predicting early or late execution of automatic actions associated with the one or more documents 152, 154, etc. Referring to the example wherein the documents 152, 154 are invoices, the action optimizer 106 predicts the temporal attributes of invoices with due dates in a specific time window. The date-document selector 402 selects as input, the open/paid invoices from the document package 150 falling due within the specific time window, along with the payment term metadata and the scores or the anomaly probabilities 258 and the duplicate probabilities 358 of each of the selected invoices.

The feature extractor 404 automatically extracts features 456 from the vendor profiles 252, vendor metadata, and the attributes of the invoices. In an example, the features 456 may include one or more of the features 256 and 356 extracted by the error and fraud detector 142 and the duplicate document detector 144. However, due to the processing of the invoices in the calculations of the anomaly probabilities 258 and duplicate probabilities 358, newer features including at least the calculated probabilities may be included in the features 456. The risk score predictor 406 uses the features to calculate invoice predictions 458. For each invoice, the risk score predictor 406 can predict the score for the likelihood of a specific action and the impact of the specific action on the given constraints. For example, in the invoice payment, the risk score predictor 406 can predict the likelihood of early payment and the cost of early payment i.e., the cash flow impact, the likelihood of late payment and the cost of late payment, and the likelihood of getting deduction and cost/benefit of a discount. As mentioned above, the impact of the actions is also predicted on different constraints e.g., cash flow predictions for the different time periods on paying each of the invoices. In an example, the risk score predictor 406 can employ trained neural networks (NN) for the invoice predictions 458.

The invoice predictions 458 and the cash flow predictions 460 form the basis of an optimization problem for automatic action execution wherein a list of invoices needs to be produced so that early payments and late payments are minimized while maximizing the available cash and without breaching the cashflow limit. This listing of invoices for payment is produced by the document action scheduler 408 which generates a list of invoices i.e., the payment worklist 180 wherein the invoices to be paid can be arranged in an ascending order to payment dates so that invoices to be paid earlier are arranged at the top of the payment worklist 180 while those to be paid are arranged further down the payment worklist 180. In an example, the document action scheduler 408 can adopt the integer programming approach for the generation of the payment worklist 180. The payment worklist 180 thus generated is provided to the action processor 108 for the execution of the automatic actions.

Figure 5:
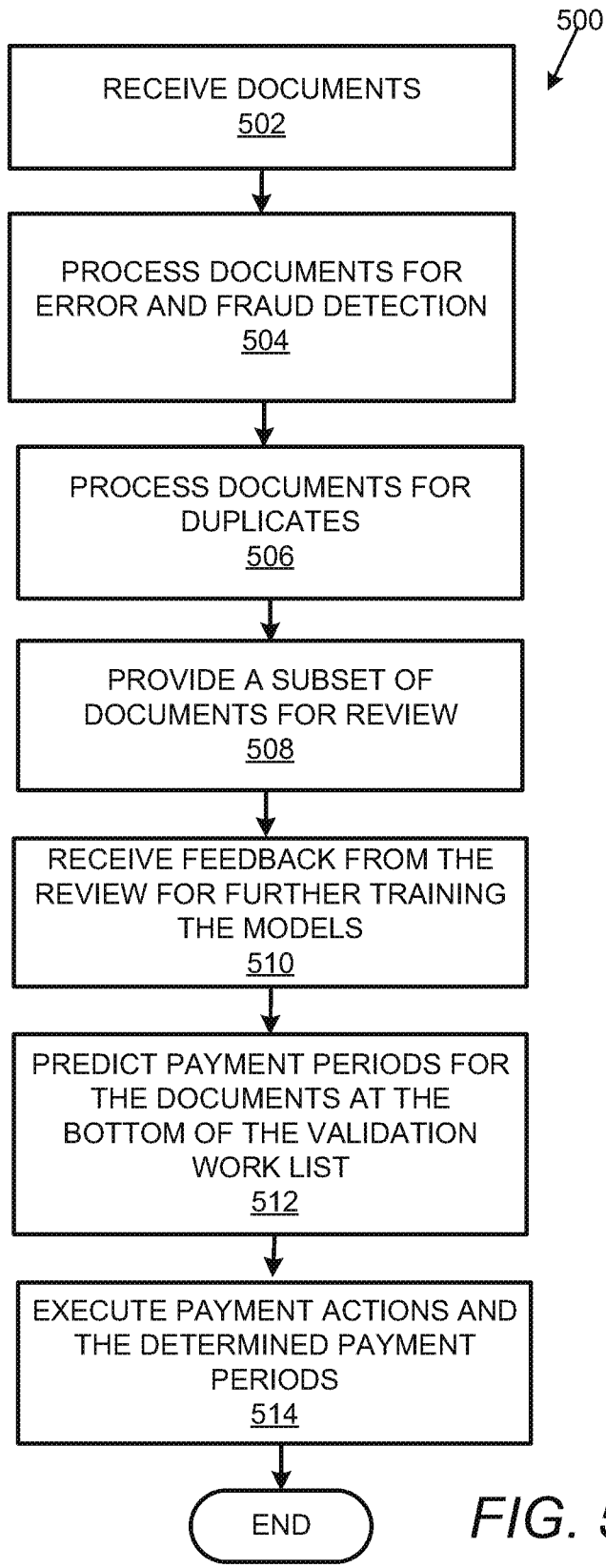
FIG. 5 shows a flowchart that details a method of processing documents such as invoices in accordance with the examples disclosed herein.

FIG. 5 shows a flowchart 500 that details a method of processing documents such as invoices in accordance with the examples disclosed herein. The method begins at 502 wherein the document package 150 including documents, e.g., the invoices 152, 154, etc., is received for processing. Hundreds of thousands of invoices can be received each day for processing by the AI-based document processing and validation system 100. The received documents are processed for error and fraud detection at 504 so that errors and aberrations in the documents are identified and corrected before payments. At 506, the documents are further processed to identify duplicate documents to pre-empt duplicate payments wherever possible. In an example, the error and fraud probabilities can be used at step 506 in determining the duplicates. The output of step 506 is the validation worklist 130 wherein the documents i.e., the invoices 152, 154, etc., are arranged in descending order of invalidity i.e., descending order of the error/fraud and duplicate probabilities.

At least a subset of the documents at the top of the validation worklist 130 i.e., the top N documents (wherein N is a natural number and N=1, 2, 3, . . . ) is provided for review at 508. In an example, the AI-based document processing and validation system 100 can be configured with the threshold probability for providing the invoices for review at 508. In an example, an AI-based model can be trained for selecting documents from the validation worklist 130 for review. The feedback from the review is received at 510 and used to train the AI models used for error and duplicate predictions. At 512, the documents at the bottom of the validation worklist 130, i.e., probabilities below the threshold probability, are processed for predicting an optimal period for execution of a related automatic action such as automatic payment. At 514, execute automatic payment actions at the time periods that are determined for the documents processed at 512.

Figure 6:
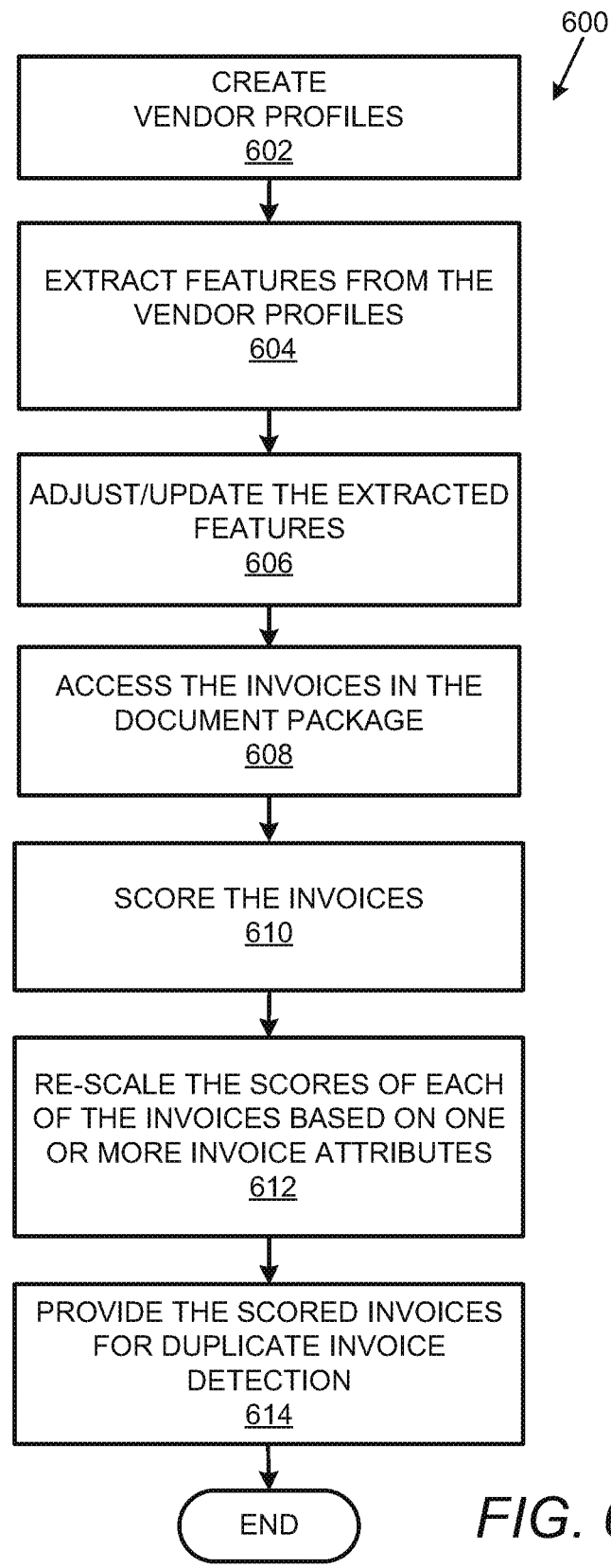
FIG. 6 shows a flowchart that details a method of error and fraud detection in accordance with the examples disclosed herein.

FIG. 6 shows a flowchart 600 that details a method of error and fraud detection in accordance with the examples disclosed herein. The method begins at 602 with vendor profile creation. The vendor profiles 252 are created based on open/paid invoices, vendor data (including various vendors issuing the invoices), feedback received from review of prior validation worklists, and historical invoices. In an example, frequency tables of categorical variables associated with vendor profiles and distribution tables for numeric variables are updated while the compute tables can be generated for derived/calculated values for generating the vendor profiles. At 604, the features 256 to be used by the anomaly detection model 206 are extracted from the vendor profiles 252. In an example, features may be extracted based on the quantile bin that an associated variable lies in. Furthermore, the feature values can be adjusted/updated at 606 based on the variable cardinality and the feedback data 176.

At 608, the newly received invoices e.g., the invoices 152, 154 in the document package 150, are accessed. At 610, the invoices 152, 154, are scored by the anomaly detection model 206 for identifying anomalies/errors and fraud. In an example, an outlier detection model such as isolation forest, CBLOF, autoencoder, etc., can be employed for anomaly detection. In addition, the reason codes associated with the scores can also be output at 610. Reason codes are associated with features which are deemed to be primary causes for the anomaly in a record. They are defined by comparing the values of these features in a specific record against the historic values of the features for that vendor. If the values for the current record lie outside the expected distribution of values for the feature, the feature is flagged as a likely cause of an anomaly, and tagged with a corresponding reason code. This aids, for example, in the manual validation of the record. In an example, the scores of each of the invoices can be re-scaled at 612 or biased with weights based on one or more invoice attributes such as but not limited to, the amounts associated with each invoice. The invoices along with the associated scores i.e., the anomaly probabilities 258 are provided at 614 to the duplicate document detector 144 for further processing.

Figure 7:
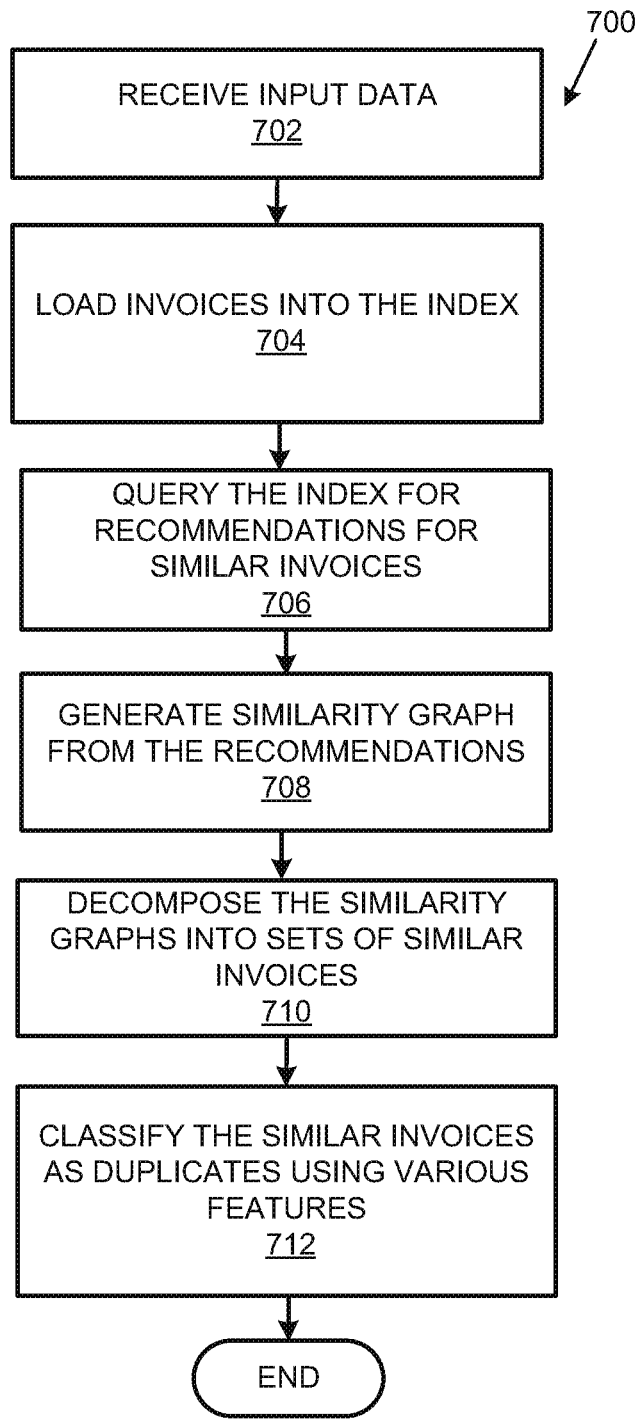
FIG. 7 shows a flowchart that details a method of identifying duplicate documents in accordance with the examples disclosed herein.

FIG. 7 shows a flowchart 700 that details a method of identifying duplicate documents in accordance with the examples disclosed herein. The method begins at 702 wherein the input data from the error and fraud detector 142 is received. The input data can include but is not limited to, data of open/paid invoices, including invoice ID, invoice type, the date the invoice was scored, and the corresponding anomaly probability/reason code for each of the invoices. Additionally, vendor data e.g., the vendor profiles 252, the feedback data 176 can also be received as inputs at 702. The received invoices are loaded into an index of invoices at 704. The index of invoices is queried at 706 to obtain recommendations for similar invoices received in the document package 150 and/or prior invoices stored in the historical data sources 172. The similarity graph is generated at 708 from the recommendations output by the query executed against the index including the invoices. At 710, the similarity graphs can be decomposed into sets of similar invoices based on connectivity. One or more of graph-theoretic algorithms, logical compositions can be used for generating the similarity graphs, and the decomposition of the similarity graphs into sets of similar invoices. At 712 the similar sets are classified as duplicates based on various features including but not limited to, set-level, invoice-level, and vendor-level features employed by the duplicate detection model 306.

Figure 8:
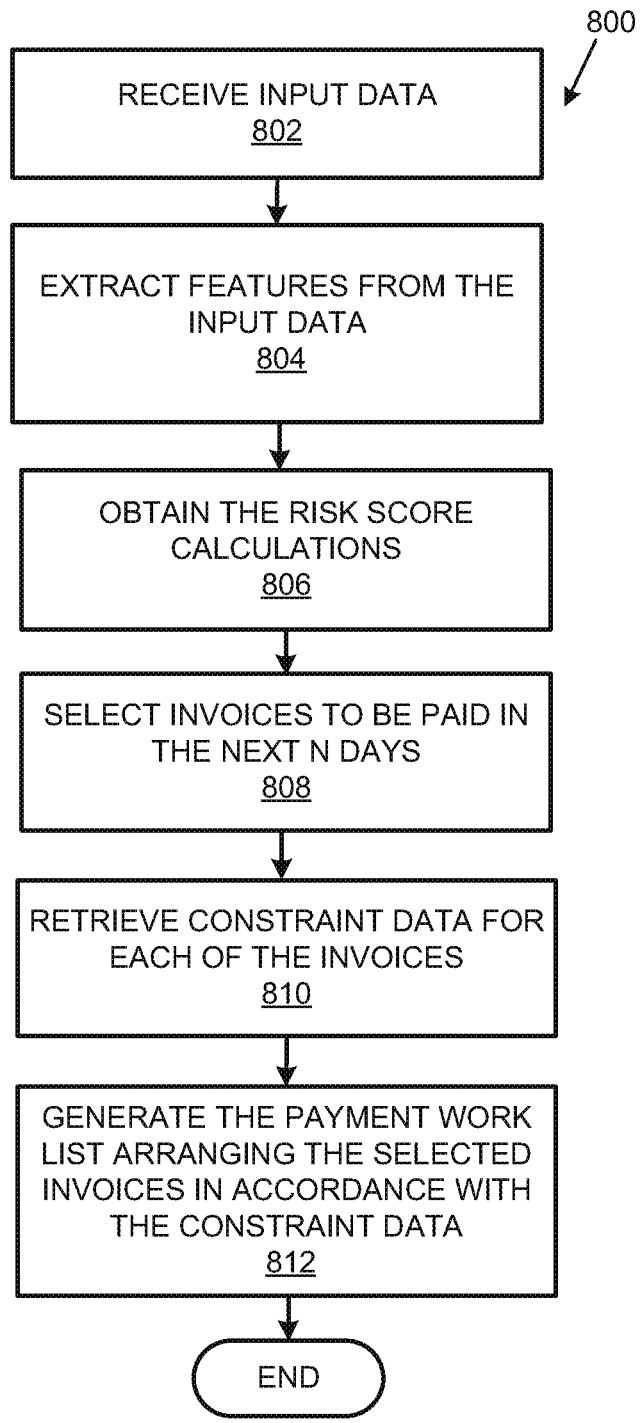
FIG. 8 shows a flowchart that details a method of predicting times for executing automatic actions in accordance with the examples disclosed herein.

FIG. 8 shows a flowchart 800 that details a method of predicting payment periods for the invoices in accordance with the examples disclosed herein. At 802 input data including but not limited to the open/paid invoices, vendor profiles, payment term metadata including the current time data, the anomaly probabilities 258, the duplicate probabilities 358 are obtained. The features are extracted from the received data at 804. At 806, predictions or risk score calculations for one of early payment or late payment are obtained for each of the invoices during a selected period. In an example, neural network models employing features extracted at 804 from the received data are used for the risk score calculations. At 808, the invoices to be paid in the next N days (wherein N is a natural number and N=1, 2, 3 . . . ) are selected based on the risk score calculations. In addition, the constraint data to such as cash flow availability be used for identifying the payment order for the invoices is retrieved at 810. At 812, the payment worklist 180 is generated as a prioritized list of invoices, wherein the discounts for the invoices are maximized without missing the payment deadline. In an example, the generation of the payment worklist 180 can be treated as an integer programming problem where the invoices are arranged in the order in accordance with the fiscal and temporal constraint data to maximize discounts. The fiscal constraint data can pertain to cash flow that must be maintained while the temporal constraints pertain to the selected time period. The payment worklist 180, is provided for automatic actions such as automatic payments at 814.

Figure 9A:
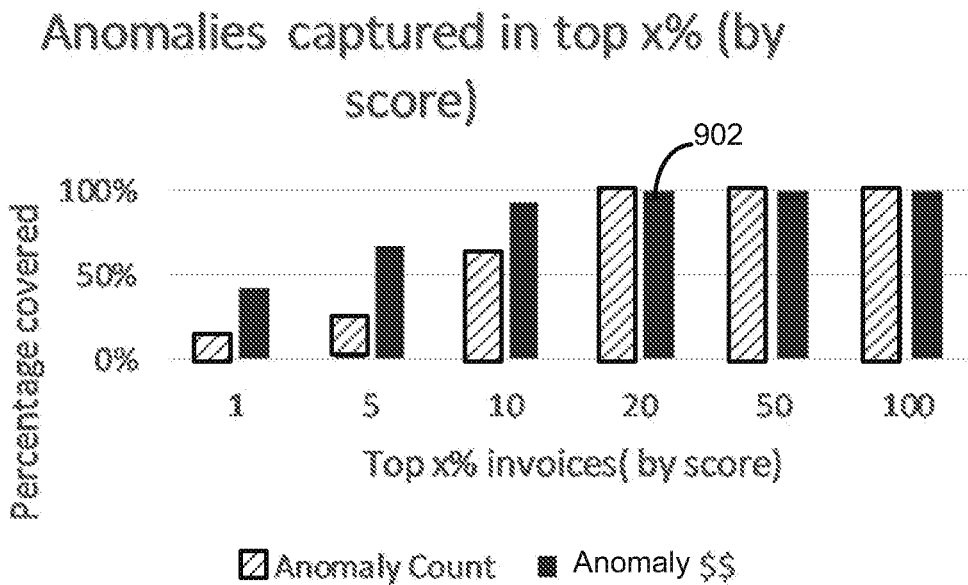
FIGS. 9A and 9B show two graphs illustrating the improvements in the document processing as provided for by the AI-based document processing and validation system in accordance with the examples disclosed herein.
Figure 9B:
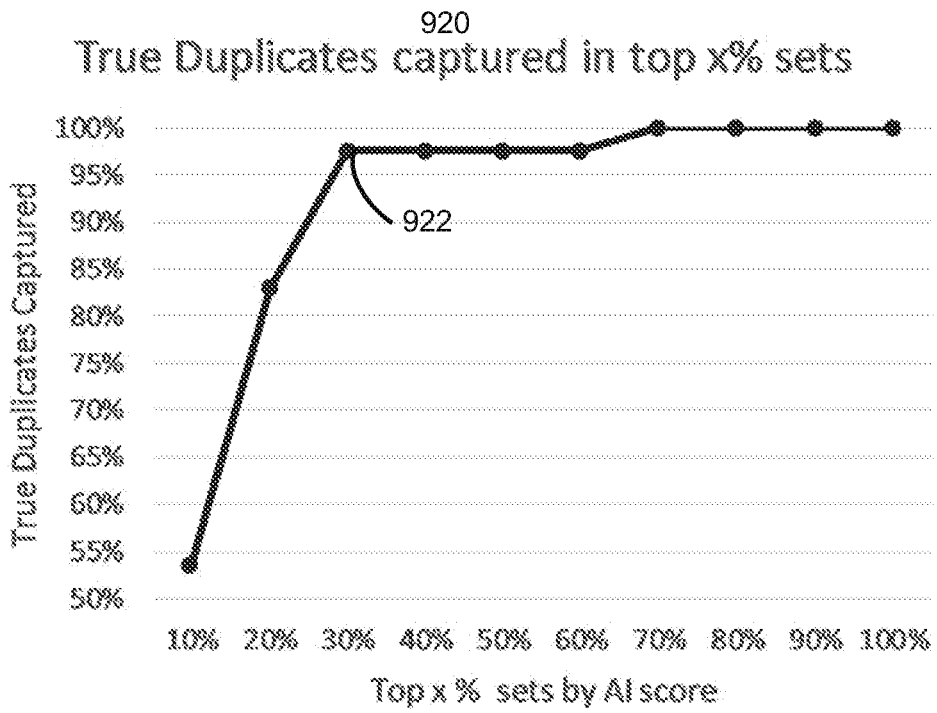

FIGS. 9A and 9B show two graphs illustrating the improvements in the document processing as provided for by the AI-based document processing and validation system 100 in accordance with the examples disclosed herein. FIG. 9A shows a bar graph 910 with the top X % of the invoices in terms of the anomalies mapped on the X-Axis and the overall percentage of documents or invoices processed by the AI-based document processing and validation system 100 on the Y-Axis. As seen from point 902 on the bar graph 910, substantially all the anomalies are captured in the top 20% of the processed invoices. As the validation worklist 130 orders the invoices in descending order of the anomaly probabilities, the AI-based document processing and validation system 100 can be configured to flag a limited number of invoices at the top of the validation worklist 130 for review while allowing the remaining invoices for automatic processing. Thus, the AI-based document processing and validation system 100 affords an improvement against systems that need to process each document/invoice for error and/or fraud.

Similarly, line graph 920 in FIG. 9B shows a plot of the top X % of sets versus the true duplicates captured on the Y-axis. The sets are generated and the true duplicates are captured by the duplicate document detector 144 in accordance with the examples disclosed herein. In an example, the duplicate document detector 144 creates sets ensuring that none of the sets created by predefined rules are missed and scores each set on its likelihood of containing true duplicates. As seen from point 922 on line graph 920, 100% of the duplicates are captured in 35-40% of the sets. Again, since the validation worklist 130 orders the invoices in descending order of the anomaly probabilities, the AI-based document processing and validation system 100 can be configured to flag a limited number of invoices at the top of the validation worklist 130 for review while allowing the remaining invoices for automatic processing. Thus, the AI-based document processing and validation system 100 affords an improvement over processing each document/invoice for identifying duplicate documents/invoices.

Figure 10:
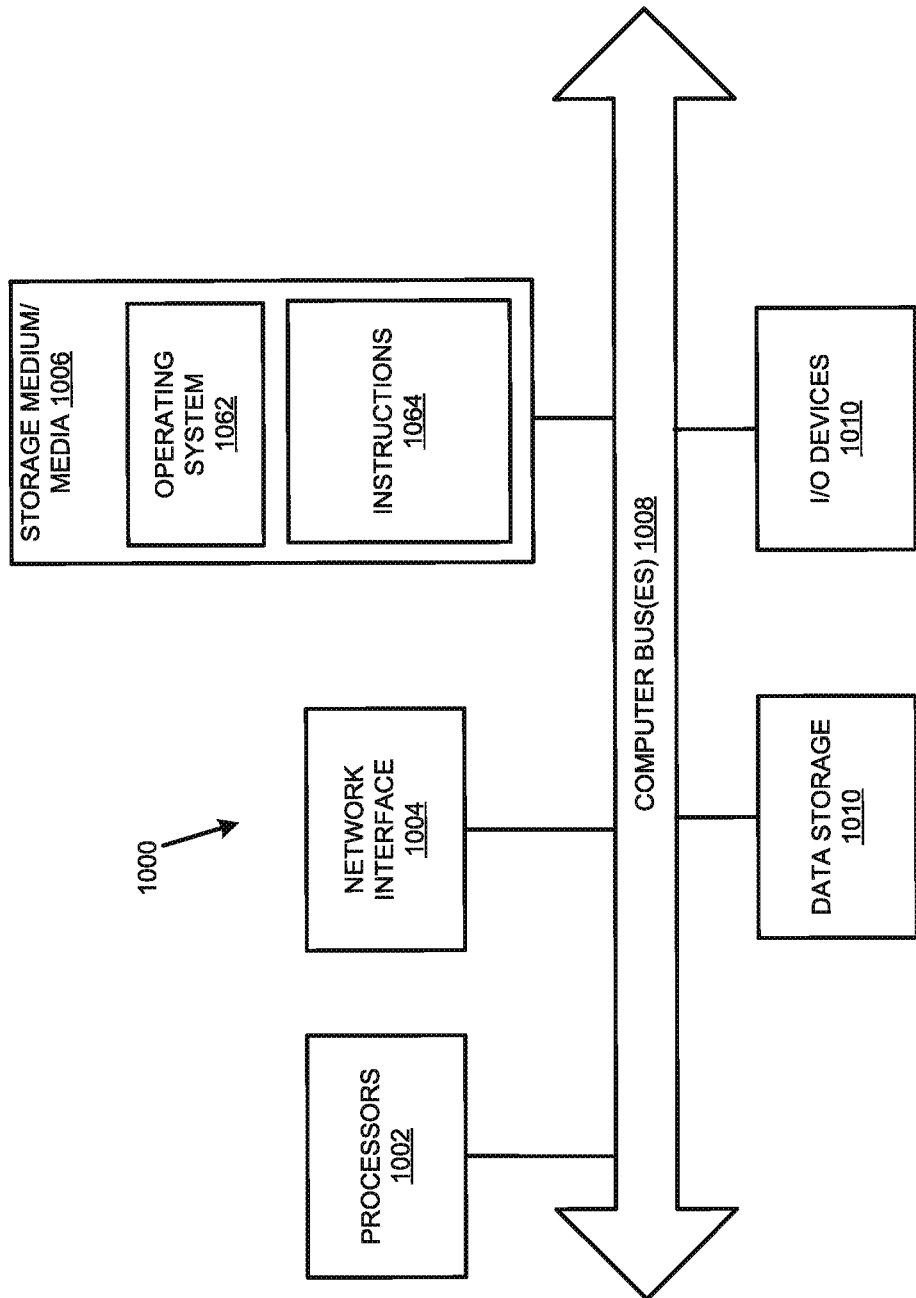
FIG. 10 illustrates a computer system that may be used to implement the AI-based document processing and validation system according to some examples disclosed herein.

FIG. 10 illustrates a computer system 1000 that may be used to implement the AI-based document processing and validation system 100 in accordance with the examples disclosed herein. More particularly, computing machines such as desktops, laptops, smartphones, tablets, and wearables which may be used to generate or access the data from the AI-based document processing and validation system 100 may have the structure of the computer system 1000. The computer system 1000 may include additional components not shown and that some of the process components described may be removed and/or modified. In another example, a computer system 1000 can sit on external-cloud platforms such as Amazon Web Services, AZURE® cloud or internal corporate cloud computing clusters, or organizational computing resources, etc.

The computer system 1000 includes processor(s) 1002, such as a central processing unit, ASIC or another type of processing circuit, input/output devices 1010, such as a display, mouse keyboard, etc., a network interface 1004, such as a Local Area Network (LAN), a wireless 802.11x LAN, a 3G, 4G or 10G mobile WAN or a WiMax WAN, and a processor-readable medium 1006. Each of these components may be operatively coupled to a bus 1008. The processor-readable or computer-readable medium 1006 may be any suitable medium that participates in providing instructions to the processor(s) 1002 for execution. For example, the processor-readable medium 1006 may be a non-transitory or non-volatile medium, such as a magnetic disk or solid-state non-volatile memory, or a volatile medium such as RAM. The instructions or modules stored on the processor-readable medium 1006 may include machine-readable instructions 1064 executed by the processor(s) 1002 that cause the processor(s) 1002 to perform the methods and functions of the AI-based document processing and validation system 100.

The AI-based document processing and validation system 100 may be implemented as software or machine-readable instructions stored on a non-transitory processor-readable medium and executed by one or more processors 1002. For example, the processor-readable medium 1006 may store an operating system 1010, such as MAC OS, MS WINDOWS, UNIX, or LINUX, and code 1014 for the AI-based document processing and validation system 100. The operating system 1062 may be multi-user, multiprocessing, multitasking, multithreading, real-time, and the like. For example, during runtime, the operating system 1010 is running and the code for the AI-based document processing and validation system 100 is executed by the processor(s) 1002.

The computer system 1000 may include a data storage 1010, which may include non-volatile data storage. The data storage 1010 stores any data used by the AI-based document processing and validation system 100. The data storage 1010 may be used as the data storage 170 to store the various invoices, features, vendor information, predicted values, and other data elements which are generated and/or used during the operation of the AI-based document processing and validation system 100.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based document processing and validation system, comprising:
at least one processor;
a non-transitory processor-readable medium storing machine-readable instructions that cause the processor to:
access a document package including one or more documents;
determine if one or more of errors and fraud exist in the one or more documents, wherein an anomaly detection model outputs error scores regarding the errors and fraud in the document;
determine if one or more of the document package and historical data sources includes duplicate documents for the one or more documents, wherein duplicate detection model outputs duplicate scores for the determination regarding the duplicate documents;
generate a validation worklist including the one or more documents scored by the anomaly detection model and the duplicate detection model, wherein the documents are arranged in a descending order of probability of having one or more of the errors and fraud and the duplicate documents;
flag invalid documents from the validation worklist for review wherein the invalid documents include a top N documents of the validation work list where N is a natural number;
train one or more of the anomaly detection model and the duplicate detection model on feedback received from the review of the top N documents;
predict one or more of early payments, and late payments for valid documents from the validation worklist, wherein the valid documents include the one or more documents from the validation work list below the top N documents and wherein the predictions are subject to fiscal and temporal constraints;
generate a payment run worklist that lists the valid documents in order of payment dates, wherein the order of the payment dates is determined based on the predictions for the early payment and the late payment for the valid documents; and
automatically pay the valid documents in the order of the payment dates.

2. The AI-based document processing and validation system of claim 1, wherein to determine if one or more of errors and fraud exist in the document the processor is to further:
update vendor-level features based on the one or more documents.

3. The AI-based document processing and validation system of claim 2, wherein to update the vendor-level features, the processor is to further:
update one or more vendor profiles, wherein the updates to the vendor profile occur based on the one or more documents, wherein updating the vendor profiles includes updating distribution tables for numeric variables and compute tables for derived features; and
score the one or more documents using the anomaly detection model employed with the vendor-level features updated from the one or more documents.

4. The AI-based document processing system of claim 3, wherein the anomaly detection model includes an unsupervised outlier detection model.

5. The AI-based document processing and validation system of claim 1, wherein to determine if the document and historical data sources include duplicate documents the processor is to further:
load an index of historical documents; and
update the index of historical documents with the one or more documents from the document.

6. The AI-based document processing and validation system of claim 5, wherein to determine if the document and historical data sources include duplicate documents the processor is to further:
identify documents from the index that are similar to the one or more documents in the document; and
form sets of the similar documents using similarity graphs.

7. The AI-based document processing and validation system of claim 6, wherein to determine if the document and historical data sources include duplicate documents the processor is to further:
classify the sets as duplicates based on one or more of set-level, document-level, and vendor-level features.

8. The AI-based document processing system of claim 1, wherein to predict the early payment, and the late payment for the valid documents, the processor is to further:
for every payment period:
predict a likelihood of the early payment and a cost of the early payment for each of the valid documents.

9. The AI-based document processing and validation system of claim 1, wherein to predict the early payment, and the late payment for the valid documents, the processor is to further:
for every payment period:
predict likelihood of the late payment and a cost of the late payment for each of the valid documents.

10. The AI-based document processing and validation system of claim 1, wherein to predict the early payment, and the late payment for the valid documents, the processor is to further:
for every payment period:
predict the likelihood of getting a deduction and cost/benefit of the deduction for each of the valid documents.

11. The AI-based document processing and validation system of claim 1, wherein predicting one or more of the early payments and late payments causes the processor to further:
predict the one or more of the early payments and the late payments within a predetermined lower limit corresponding to the fiscal constraint.

12. The AI-based document processing and validation system of claim 1, wherein the documents are invoices.

13. A non-transitory processor-readable storage medium comprising machine-readable instructions that cause a processor to:
- access a document package including one or more documents;
- determine if one or more of errors and fraud exist in the one or more documents, wherein an anomaly detection model outputs anomaly probabilities regarding the errors and fraud in the one or more documents;
- determine if one or more of the document package and historical data sources includes duplicate documents for the one or more documents, wherein duplicate detection model outputs duplicate probabilities for the determination regarding the duplicate documents;
- generate a validation worklist including the one or more documents scored by the anomaly detection model and the duplicate detection model, wherein the documents are arranged in descending order of probability of having one or more of the errors and fraud and the duplicate documents;
- flag invalid documents from the validation worklist for review wherein the invalid documents include top N documents of the validation worklist where N is a natural number;
- predict one or more of early payments, and late payments for valid documents from the validation worklist, wherein the valid documents include the one or more documents from the validation worklist below the top N documents and wherein the predictions are subject to fiscal and temporal constraints;
- generate a payment run worklist that lists the valid documents in order of payment dates, wherein the order of the payment dates is determined based on the predictions for the early payment and the late payment for the valid documents; and
- automatically pay the valid documents in the order of the payment dates.

14. The non-transitory processor-readable storage medium of claim 13, wherein executing the automatic actions includes further instructions that cause the processor to:
- generate a payment run worklist that lists the one or more documents that are below the top N documents in the validation worklist in accordance with the predictions, wherein the automatic actions include automatic payments and the predictions include payment due dates and entries in the payment run worklist are listed in ascending order of payment due dates.

15. A artificial Intelligence (AI) based document processing and validation method implemented by one or more processors, the method comprising:
- accessing, by the one or more processors, a document package including one or more documents;
- determining, by the one or more processors, if one or more of errors and fraud exist in the one or more documents, wherein an anomaly detection model outputs error scores regarding the errors and fraud in the document;
- determining, by the one or more processors, if one or more of the document package and historical data sources includes duplicate documents for the one or more documents, wherein duplicate detection model outputs duplicate scores for the determination regarding the duplicate documents;
- generating, by the one or more processors, a validation worklist including the one or more documents scored by the anomaly detection model and the duplicate detection model, wherein the documents are arranged in a descending order of probability of having one or more of the errors and fraud and the duplicate documents;
- flagging, by the one or more processors, invalid documents from the validation worklist for review wherein the invalid documents include a top N documents of the validation work list where N is a natural number;
- training, by the one or more processors, one or more of the anomaly detection model and the duplicate detection model on feedback received from the review of the top N documents;
- predicting, by the one or more processors, one or more of early payments, and late payments for valid documents from the validation worklist, wherein the valid documents include the one or more documents from the validation work list below the top N documents and wherein the predictions are subject to fiscal and temporal constraints;
- generating, by the one or more processors, a payment run worklist that lists the valid documents in order of payment dates, wherein the order of the payment dates is determined based on the predictions for the early payment and the late payment for the valid documents; and
- automatically paying, by the one or more processors, the valid documents in the order of the payment dates.

16. The AI-based document processing and validation method of claim 15, wherein determining if one or more of errors and fraud exist in the document the processor is to further:
- updating, by the one or more processors, vendor-level features based on the one or more documents.

17. The AI-based document processing and validation method of claim 16, wherein updating the vendor-level features further comprises:
- updating, by the one or more processors, one or more vendor profiles, wherein the updates to the vendor profile occur based on the one or more documents, wherein updating the vendor profiles includes updating distribution tables for numeric variables and compute tables for derived features; and
- scoring, by the one or more processors, the one or more documents using the anomaly detection model employed with the vendor-level features updated from the one or more documents.

18. The AI-based document processing and validation method of claim 15, wherein to determine if the document and historical data sources include duplicate documents the processor is to further:
- loading, by the one or more processors, an index of historical documents; and
- updating, by the one or more processors, the index of historical documents with the one or more documents from the document.

19. The AI-based document processing and validation method of claim 15, wherein predicting the early payment, and the late payment for the valid documents comprises:
for every payment period:
- predicting, by the one or more processors, a likelihood of the early payment and a cost of the early payment for each of the valid documents; and
- predicting, by the one or more processors, likelihood of the late payment and a cost of the late payment for each of the valid documents.

20. The AI-based document processing and validation method of claim 15, wherein predicting the early payment, and the late payment for the valid documents further comprises:

for every payment period:
        predicting, by the one or more processors, a likelihood of getting a deduction and cost/benefit of the deduction for each of the valid documents.

\* \* \* \* \*